(12) United States Patent
Russell

(10) Patent No.: US 8,342,613 B2
(45) Date of Patent: Jan. 1, 2013

(54) AFFIXMENT SYSTEM FOR WHEEL CLADDING

(75) Inventor: Martin Russell, Smyrna, TN (US)

(73) Assignee: Zanini Auto Grup, SA, Barcelona (ES)

( * ) Notice: Subject to any disclaimer, the term of this patent is extended or adjusted under 35 U.S.C. 154(b) by 389 days.

(21) Appl. No.: 12/723,094

(22) Filed: Mar. 12, 2010

(65) Prior Publication Data

US 2010/0231029 A1    Sep. 16, 2010

Related U.S. Application Data

(60) Provisional application No. 61/159,489, filed on Mar. 12, 2009.

(51) Int. Cl.
*B60B 7/14* (2006.01)

(52) U.S. Cl. ........... 301/37.372; 301/37.102; 301/37.12; 301/37.375; 301/37.43

(58) Field of Classification Search ............. 301/37.101, 301/37.27, 37.102, 37.34, 37.12, 37.42, 37.43, 301/37.372, 37.374, 37.375
See application file for complete search history.

(56) References Cited

U.S. PATENT DOCUMENTS

| | | | |
|---|---|---|---|
| 3,894,775 A | 7/1975 | Christoph et al. | |
| 4,004,837 A | 1/1977 | Main | |
| 4,502,256 A | 3/1985 | Hahn | |
| 4,683,831 A | 8/1987 | Shaffner | |
| 5,368,370 A * | 11/1994 | Beam | 301/37.36 |
| 5,458,401 A | 10/1995 | Baccman | |
| 5,577,809 A * | 11/1996 | Chase | 301/37.43 |
| 5,873,637 A | 2/1999 | Ichikawa | |
| 6,637,832 B2 | 10/2003 | Wrase | |
| 6,663,189 B2 * | 12/2003 | Enomoto et al. | 301/37.36 |
| 6,805,413 B2 * | 10/2004 | Fitzgerald | 301/37.106 |
| 6,991,299 B2 | 1/2006 | Hauler | |
| 7,452,037 B1 | 11/2008 | Nunes | |
| 7,562,939 B2 * | 7/2009 | Zanin | 301/37.372 |
| 8,020,945 B2 * | 9/2011 | Takeda et al. | 301/37.371 |
| 2004/0074820 A1 | 4/2004 | Sawall et al. | |
| 2005/0123372 A1 | 6/2005 | Sato | |
| 2005/0151414 A1 | 7/2005 | Hauler | |
| 2008/0106140 A1 | 5/2008 | Velez | |

* cited by examiner

*Primary Examiner* — Jason Bellinger
(74) *Attorney, Agent, or Firm* — Seth Natter; Natter & Natter

(57) ABSTRACT

The present invention comprises an affixment system for securing wheel cladding to a vehicle wheel, with the wheel including a hub and a plurality of radial spokes extending between the hub and a wheel rim. Each wheel spoke includes at least one aperture for seating a mushroom head expansion clip mounted to the inner face of corresponding spokes of the wheel cladding.

19 Claims, 6 Drawing Sheets

AFFIXMENT SYSTEM FOR WHEEL CLADDING

RELATED APPLICATIONS

This application claims the benefit of U.S. Provisional Application No. 61/159,489 filed Mar. 12, 2009, the entirety of which is incorporated herein by reference.

BACKGROUND OF THE INVENTION

1. Field of the Invention

This invention relates generally to decorative vehicle wheels and more particularly to an affixment system for permanently mounting a wheel cladding over the outer face of a vehicle wheel.

2. Antecedents of the Invention

Although wheel covers have continued to play a significant role with respect to providing a pleasant and stylized appearance to vehicle wheels in both new car and aftermarket applications, there has been a trend in new car sales to equip vehicles with cast metal stylized vehicle wheels. Such trend has increased to the extent that stylized cast metal wheels have become standard equipment, not only on luxury vehicles, but in addition, on moderately priced vehicles.

Dynamic wheel balancing has been easier to achieve and maintain with cast metal wheels for the reason that compensation was not required for the additional weight of a wheel cover. Further, conventional wheel covers were subject to inadvertent dislodgment and consequent loss and, in addition, to loss by theft or vandalism.

While there has been a decrease in the number of available vehicle models, individual customer preferences and the availability of options has been a consideration in new vehicle marketing and sales promotion. Unfortunately, when cast metal wheels were standard or optional equipment with specific vehicle models, only one surface treatment for the wheel was available. Such limitation was a consequence of the costs involved in acquiring and maintaining inventories of numerous wheels for a particular vehicle model, each with the same dimensions and structure, but with different surface treatments. Wheel claddings, which covered the outer face of a vehicle wheel and which carried a decorative surface treatment have been previously employed for the purpose of providing a variety of available finishes to permanently cover the outer face of a stock cast vehicle wheel.

A variety of systems have been proposed for mounting wheel cladding to a vehicle wheel, such as adhesives, as disclosed in U.S. Pat. No. 5,458,401, which is incorporated herein in its entirety. Other proposed systems included the employment of snap tabs extending from the cladding into radially undercut recesses in a side of the wheel at a central wheel hub, as disclosed in U.S. Pat. No. 6,637,832. Such hub mounting arrangement did not serve to secure the radially outer periphery of the cladding to the wheel rim and was also subject to heat degradation.

SUMMARY OF THE INVENTION

A composite vehicle wheel includes a metal wheel having a hub, a rim and a plurality of spokes interconnecting the hub and the rim. Permanently overlying the exterior face of the wheel is a wheel cladding having a hub portion, a rim portion and a plurality of spokes interconnecting the cladding hub with the cladding rim.

Each wheel spoke includes at least one axial aperture and the inner face of the corresponding cladding spoke includes an axially projecting mushroom head expansion clip which is forced through the aperture and engages the inner face of the spoke. Auxiliary securement is provided at the hub of the cladding by flanged vehicle lug nuts or by flanged lug nut covers with the flanges engaging the outer face of lug nut apertures formed in the cladding.

From the foregoing compendium, it will be appreciated that it is an aspect of the present invention to provide an affixment system for wheel cladding of the general character described which is not subject to the disadvantages of the antecedents of the invention aforementioned.

It is a feature of the present invention to provide an affixment system for wheel cladding of the general character described which facilitates the manufacture of composite wheels with relatively low assembly costs.

To provide an affixment system for wheel cladding of the general character described which is well suited for economic mass production fabrication is a consideration of the present invention.

Another feature of the present invention is to provide an affixment system for wheel cladding of the general character described which permanently secures wheel cladding to a vehicle wheel without being subject to heat degradation.

Another feature of the present invention is to provide an affixment system for wheel cladding of the general character described which preclude inadvertent dislodgment of cladding.

Yet another consideration of the present invention is to provide an economical method for assembling a composite vehicle wheel.

A further feature of the present invention is to provide an affixment system for wheel cladding of the general character described which is long lasting.

Further aspects, features and considerations of the present invention in part will be obvious and in part will be pointed out hereinafter.

With these ends in view, the invention finds embodiment in certain combinations of elements, arrangements of parts and series of steps by which the said aspects, features, and considerations and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings, in which is shown one of the various possible exemplary embodiments of the invention.

DESCRIPTION OF THE PREFERRED EMBODIMENT

This invention relates generally to wheel trim and more particularly to a mounting system for wheel cladding. Wheel cladding, as opposed to a wheel cover, comprises a decorative skin or overlay which is permanently affixed to the wheel to overlie all or part of the axially exterior face of the wheel.

Figure 1:
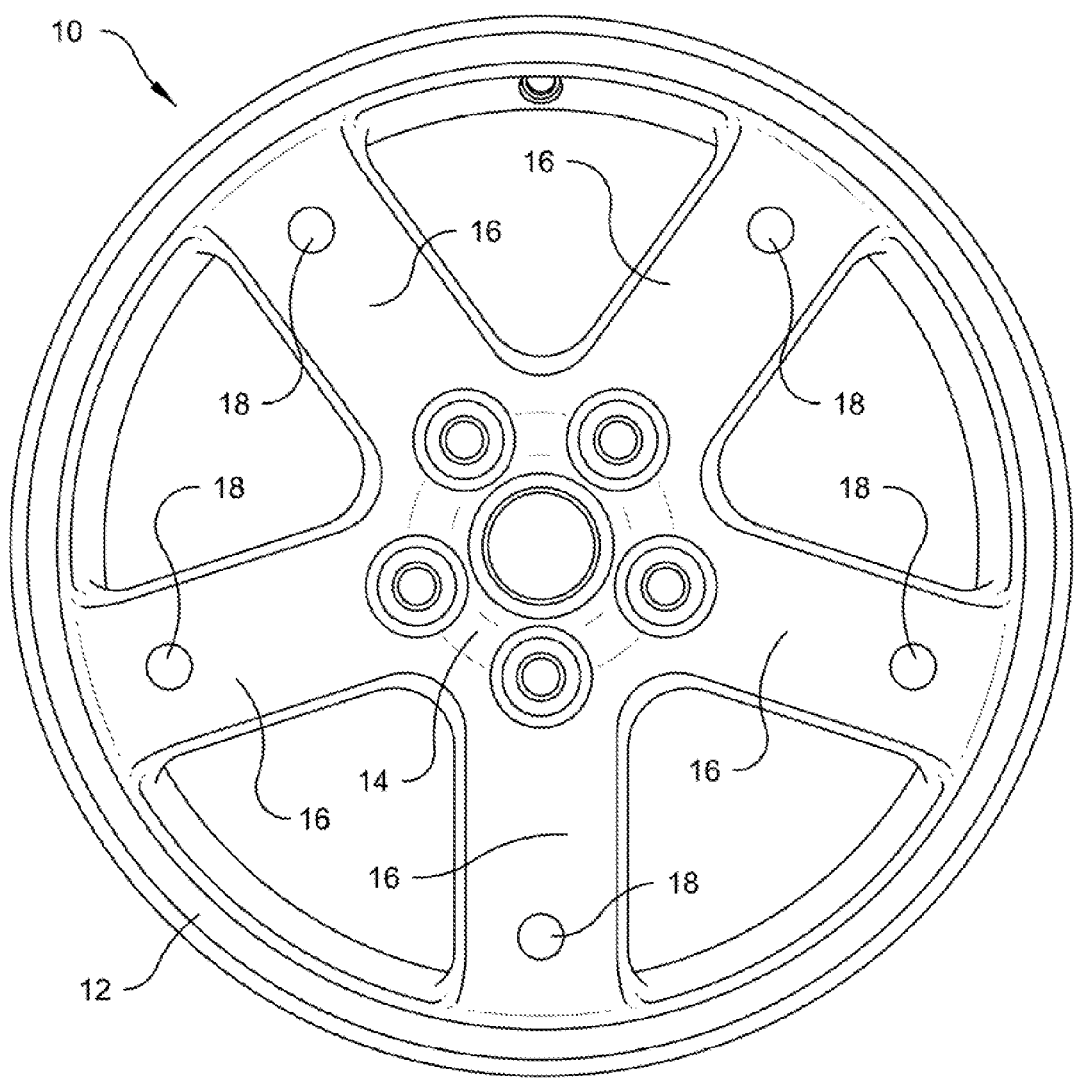
FIG. 1 is a front elevational view of a wheel prior to mounting of wheel cladding over the outer face thereof.

As illustrated in FIG. 1, a wheel 10 comprises a wheel rim 12 and a central hub 14, with a plurality of radial spokes 16 extending between the hub 14 and the wheel rim 12. Pursuant to the affixment system of the present invention, at least one axial aperture 18 is provided through one or more of the spokes 16. The term "spoke" as employed herein shall include any structural component spanning between the hub and the rim, e.g. a web, panel, etc.

Figure 2:
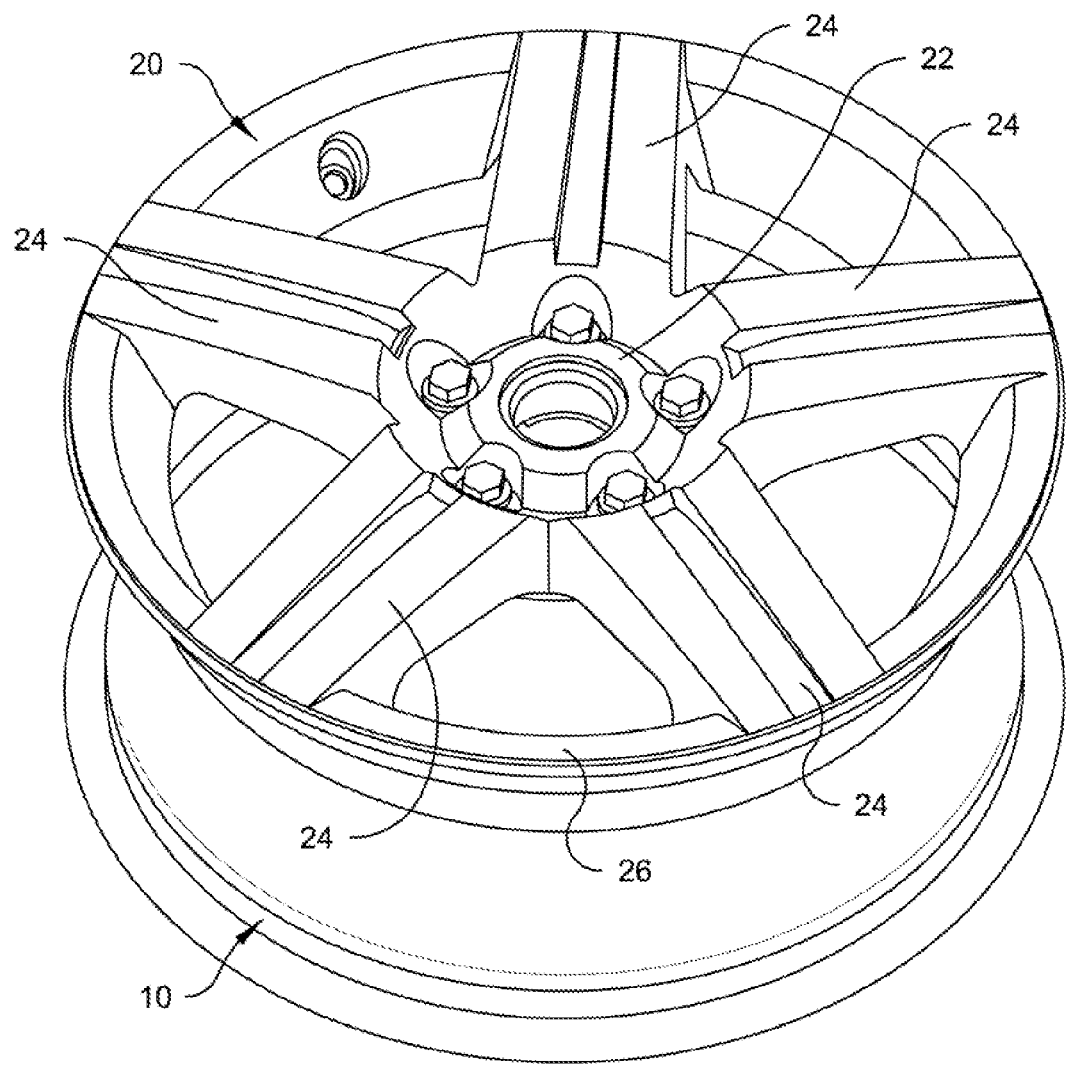
FIG. 2 is an isometric illustration of a composite wheel with a wheel cladding permanently affixed to its outer face in accordance with the affixment system of the present invention.
Figure 3:
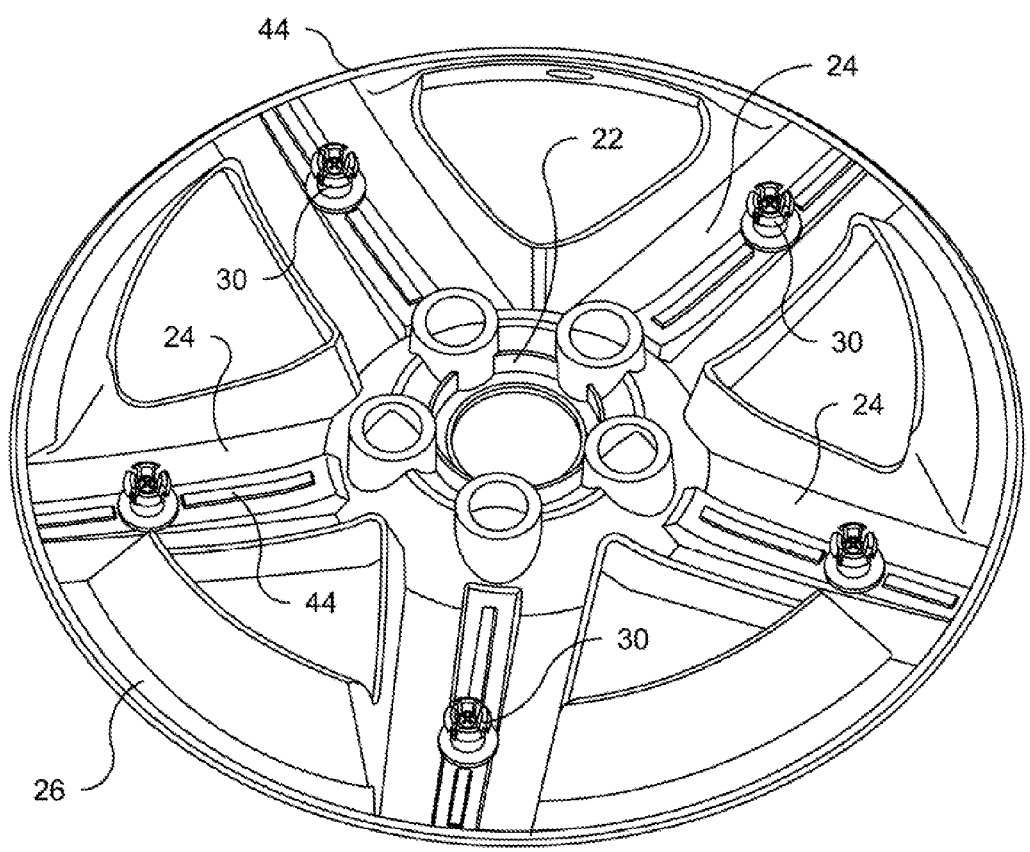
FIG. 3 is an isometric view of the inner face of the wheel cladding and illustrating a mushroom head expansion clip which projects axially from each wheel cladding spoke.

Illustrated in FIG. 2 is a composite wheel comprising the metal wheel 10 having a wheel cladding 20 permanently secured over the outer face of the wheel. The wheel cladding 20 is configured to overlie all or part of the axially outer face of the wheel 10 and accordingly includes a hub portion 22 configured to overlie the wheel hub 14 and a plurality of spokes 24, configured to overlie the wheel spokes 16. The spokes 24 extend to a peripheral ring 26, with the ring 26 being configured to overlie the wheel rim 12 up to a wheel rim flange 27. The hub portion 22 includes a plurality of wheel lug apertures.

Figure 5:
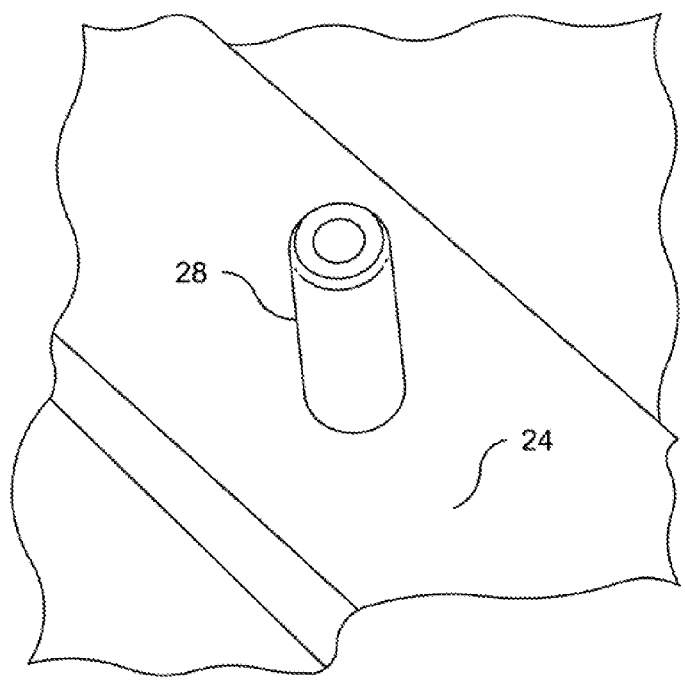
FIG. 5 is an enlarged fragmentary isometric view of the inner face of a wheel cladding and illustrating a post to which a mushroom head expansion clip is mounted.

It should be noted that on the inner face of each wheel cladding spoke 24, an integral mounting post 28 is provided, as illustrated in FIG. 5. Each mounting post 28 serves to anchor a mushroom head expansion clip 30.

Figure 6:
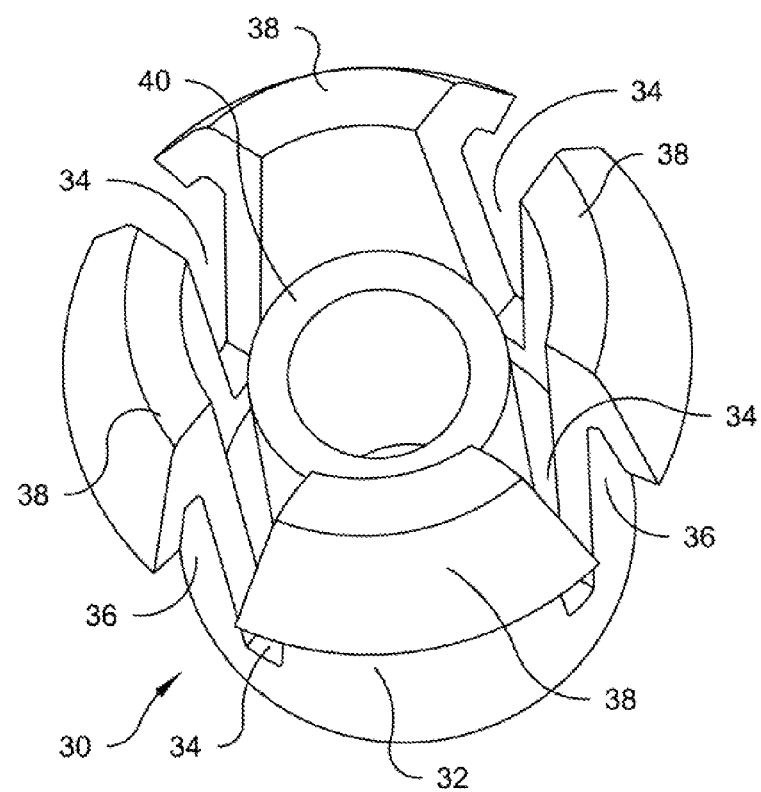
FIG. 6 is an isometric view of a mushroom head expansion clip in accordance with the invention, prior to being secured to a post.

As shown in FIG. 6, the expansion clip 30 comprises a generally cylindrical body 32 having a plurality of axial slots 34 which define expansion fingers 36. The distal end of each expansion finger 36 includes a curved, radially outwardly extending fluke 38 to provide the overall appearance of a mushroom head.

Extending from the interior of the base of the cylindrical body 32 is a short cylindrical mounting collar 40 having an inner diameter which mates with the outer diameter of the mounting post 28.

Figure 4:
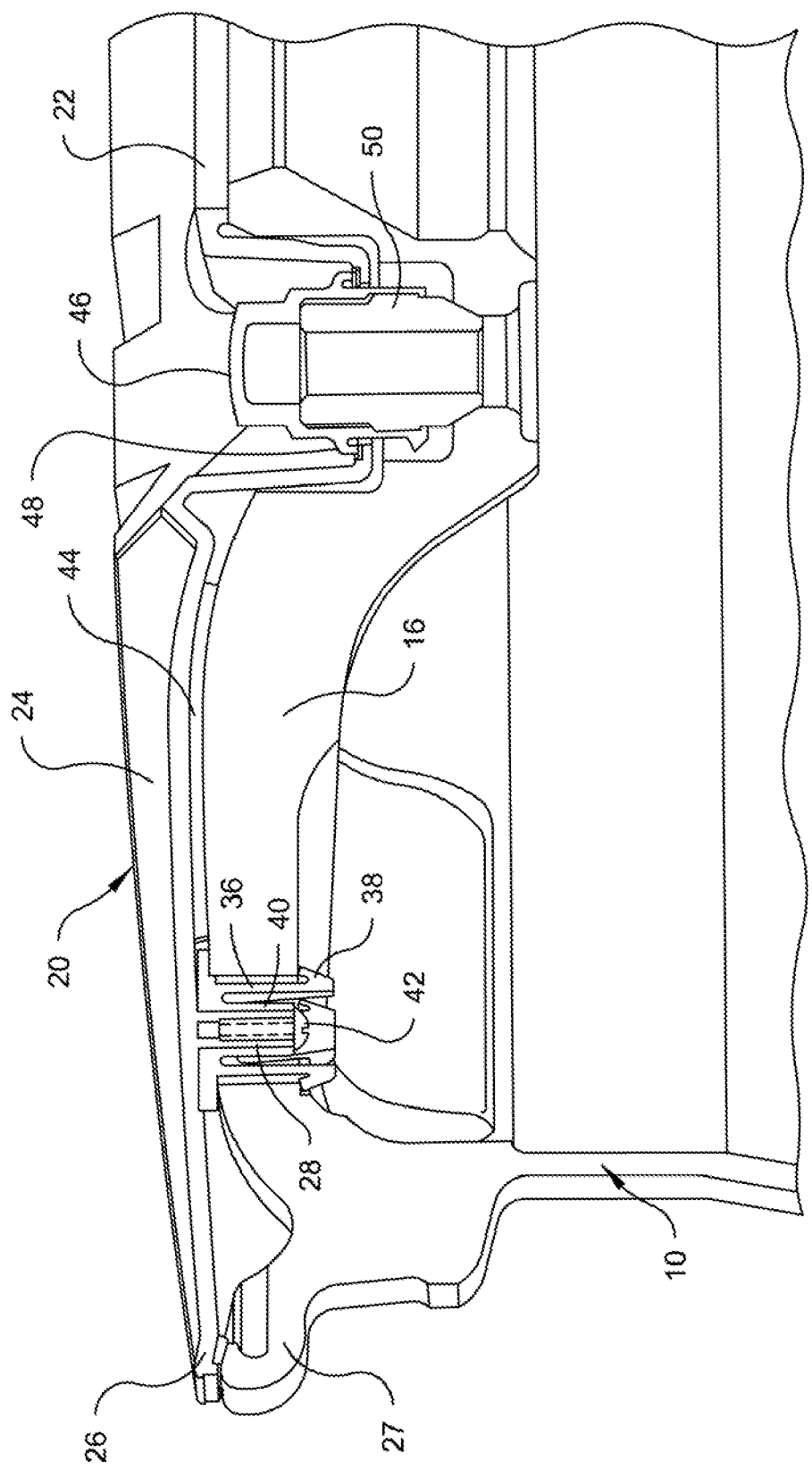
FIG. 4 is sectional view through the composite wheel with wheel cladding and illustrating details of the affixment system.
Figure 7:
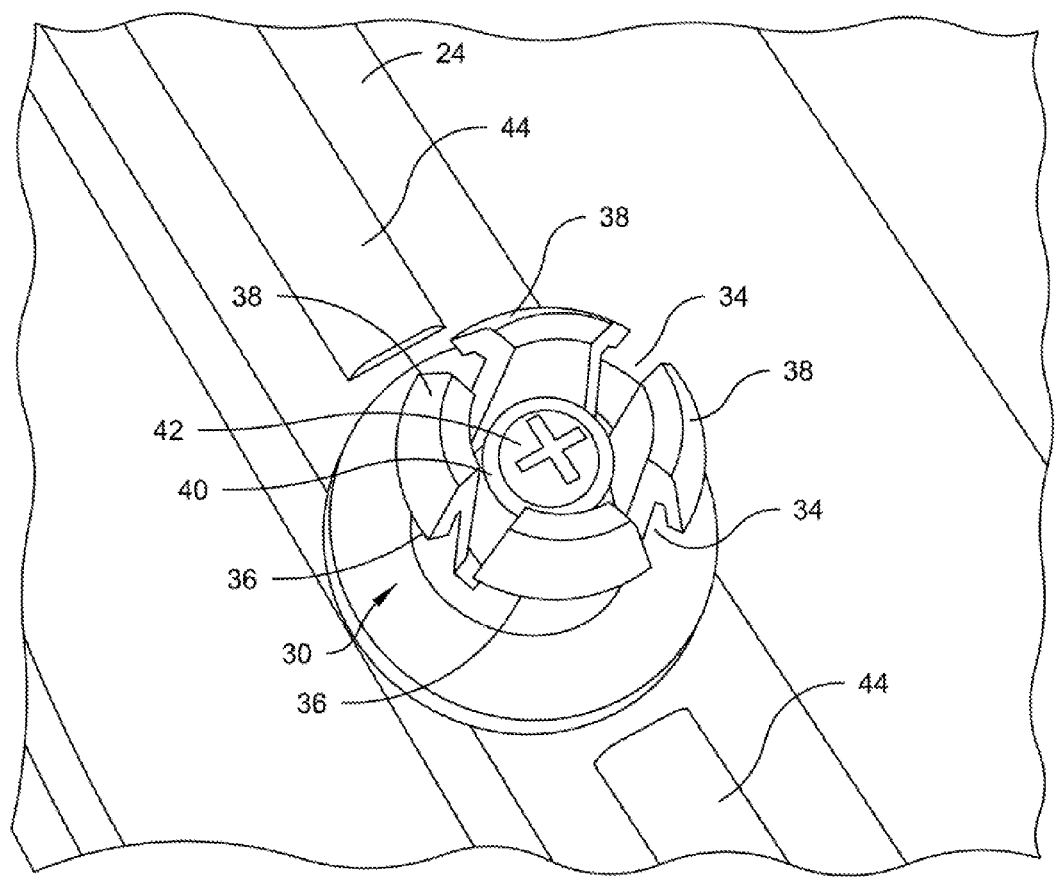
FIG. 7 is an enlarged fragmentary isometric view of the inner face of a wheel cladding and showing the mushroom head expansion clip mounted to a post.

The expansion clips 30 are secured to the inner face of the wheel cladding spoke 24 by being positioned over the mounting post, such that the mounting collar 40 surrounds the mounting post 28 and thereafter, a fastener, such as a screw 42, having an enlarged head, is driven into a central bore of the mounting post 28 as illustrated in FIG. 4. It should be noted that the screw head overlies the top of the mounting collar 40 to secure the clip 30 to the post 28. An examination of FIG. 4 also reveals that the mounting post 28 and the wheel cladding 20 are formed of one piece construction and that the mounting post 28, the mounting collar 40 and the cylindrical body 32 are concentric. Additionally as illustrated in FIGS. 4, 6 and 7, the outer diameter of the mounting collar 40 is less than the inner diameter of the cylindrical body 32.

It is significant to note that the assembled expansion clips 30 are each positioned to be registered with a spoke aperture 18. The diameter of the expansion clip cylindrical body 32 is such to be received within the wheel spoke aperture 18.

It should be further noted that during assembly, the expansion fingers 36 are deflected radially inwardly as the flukes 38 engage the aperture 18. After the flukes extend axially beyond the inner face of the wheel assembly spoke 16, the expansion fingers snap radially outwardly so that the flukes 38 overlie the inner face of the spoke 16 which surrounds the aperture 18 and thus lock the wheel cladding 20 in position on the wheel 10.

Beads of closed cell foam material 44 may be optionally applied to the inner face of the wheel cladding for vibration and noise reduction.

While the expansion clips 30 serve to permanently affix the wheel cladding 20 to the wheel assembly 10, additional secondary securement may be optionally provided by wheel lug nut covers 46 having radial flanges 48. The lug nut covers 46 may include internal threads which engage external threads of lug nuts 50 which secure the wheel 10 to the vehicle, as disclosed in U.S. Pat. No. 4,998,780, the entirety of which is incorporated herein by reference.

Alternate secondary securement in lieu of wheel nut covers may be provided by employing flanged lug nuts, with the flanges overlying the lug openings of the cladding. The flange may be integral with the lug nut or may comprise a snap ring which seats in a groove of the lug nut.

The wheel 10 may be formed of any suitable material, such as aluminum, while the wheel cladding and expansion clips may be formed of any suitable plastic.

Thus, it will be seen that there is provided an affixment system for wheel cladding of the general character described which achieves the various aspects, features and considerations of the present invention and which is well suited to meet the conditions of practical use.

As various changes might be made in the exemplary embodiment above set forth, it is to be understood that all matter herein described or shown in the accompanying drawings is to be interpreted as illustrative and not in a limiting sense.

Having thus described the invention, there is claimed as new and desired to be secured by Letters Patent:

1. A composite vehicle wheel including a hub, a rim and a plurality of spokes interconnecting the hub to the rim, the wheel including an inner face and an outer face, the composite wheel further including a wheel cladding covering at least a portion of the outer face of the wheel, the cladding having an inner face and an outer face, the cladding further including at least one mounting post integral with the cladding and extending axially from the inner face of the cladding, at least one mushroom head clip, the mushroom head clip including a mounting collar, the mounting collar surrounding the mounting post and being concentric therewith, the cladding further including a screw having an enlarged head extending into a bore formed in the mounting post, the enlarged head abutting the mounting collar to secure the mushroom head clip to the mounting post, the mushroom head clip extending axially through an aperture formed in the wheel, at least a portion of the mushroom head clip overlying at least a portion of the inner face of the wheel surrounding the aperture whereby the cladding is permanently affixed to the wheel.

2. A composite vehicle wheel as constructed in accordance with claim 1 wherein the wheel cladding includes a cladding hub, a cladding rim and a plurality of cladding spokes interconnecting the cladding hub to the cladding rim, the at least one mushroom head clip extending axially from the inner face of a cladding spoke, the aperture being formed through at least one of the plurality of spokes.

3. A composite vehicle wheel as constructed in accordance with claim 1 wherein the mushroom head clip includes a cylindrical body, the mounting collar being concentric with the cylindrical body, the mounting collar having an outer diameter less than the inner diameter of the cylindrical body.

4. A composite vehicle wheel as constructed in accordance with claim 1 wherein the mushroom head clip comprises a cylindrical body having a plurality of axial slots defining expansion fingers and a curved radially outwardly extending fluke positioned at the end of each expansion finger, the portion of the mushroom head clip overlying at least a portion of the inner face of the wheel comprising the fluke.

5. A composite vehicle wheel as constructed in accordance with claim 1 wherein the at least one mounting post and the cladding are formed of unitary one piece construction.

6. A composite vehicle wheel as constructed in accordance with claim 2 wherein the hub includes a plurality of lug openings, a lug being positioned in each of the lug openings and the cladding hub includes lug openings, the aperture and the at least one mushroom head clip being spaced radially outwardly from the hub, the composite vehicle wheel further including at least one flange secured relative to at least one lug, the flange overlying the outer face of the lug nut openings of the cladding, whereby secondary securement is provided for the cladding.

7. A composite vehicle wheel as constructed in accordance with claim 6 further including a lug nut and a lug nut cap, the flange being positioned on the lug nut cap.

8. An affixment system for wheel cladding associated with a vehicle wheel, the vehicle wheel including a hub, a rim and at least one spoke interconnecting the hub and the rim, the wheel including an inner face and an outer face, the wheel cladding being configured to cover at least a portion of the outer face of the wheel, the cladding having an inner face and an outer face, at least one mounting post formed of one piece with the cladding and extending axially from the inner face of the cladding, at least one mushroom head clip, the mushroom head clip including a mounting collar, the mounting collar surrounding the mounting post and being concentric therewith, the cladding further including a screw having an enlarged head extending into a bore formed in the mounting post, the enlarged head abutting the mounting collar to secure the mushroom head clip to the mounting post, the mushroom head clip extending axially from the inner face of the cladding, the mushroom head clip extending through an aperture formed in the spoke with a portion of the mushroom head clip overlying at least a portion of the inner face of the spoke surrounding the aperture.

9. An affixment system for wheel cladding as constructed in accordance with claim 8 wherein the mushroom head clip comprises a cylindrical body having a plurality of axial slots defining expansion fingers, each expansion finger including a curved radially outwardly extending fluke at the distal end thereof.

10. An affixment system for wheel cladding as constructed in accordance with claim 8 wherein the mushroom head clip includes a cylindrical body, the cylindrical body and the mounting collar being concentric, the cylindrical body having an inner diameter greater than the outer diameter of the mounting collar.

11. A method of fabricating a composite vehicle wheel as constructed in accordance with claim 4, the method comprising the steps of:
a) registering the mushroom head clip with the aperture,
b) axially moving the wheel cladding toward the outer face of the wheel while engaging the mushroom head clip into the aperture,
c) urging the expansion fingers radially inwardly by engagement between the flukes and the aperture, and
d) allowing the expansion fingers to snap outwardly with the flukes overlying the inner face of the wheel adjacent the aperture.

12. A composite vehicle wheel as constructed in accordance with claim 1 further including closed cell foam positioned between the inner face of the cladding and the outer face of the wheel.

13. A composite vehicle wheel as constructed in accordance with claim 12 wherein the closed cell foam comprises a bead.

14. An affixment system for wheel cladding as constructed in accordance with claim 8 further including at least one bead of closed cell foam positioned on the inner face of the cladding.

15. A composite vehicle wheel as constructed in accordance with claim 2 further including closed cell foam positioned on the inner face of the cladding spoke adjacent the mushroom clip.

16. A composite vehicle wheel as constructed in accordance with claim 15 wherein the closed cell foam is configured as a bead.

17. A method of fabricating a composite vehicle wheel comprising a wheel having an outer face, an inner face and a wheel cladding covering at least a portion of the outer face, the method including the steps of:
a) forming the cladding in one piece with a plurality of mounting posts extending axially from the inner face of the cladding,
b) fabricating a plurality of mushroom head clips with a cylindrical body, a plurality of axial slots defining expansion fingers and a curved radially outwardly extending fluke at the end of each expansion finger,
c) positioning the cylindrical body over the mounting post,
d) fastening the plurality of mushroom head clips to the inner face of the wheel cladding by securing the cylindrical body to the mounting post,
e) providing a like plurality of apertures through the wheel, and
f) axially positioning each mushroom head clip through an aperture until the mushroom head of the clip overlies at least a portion of the surface of the inner face of the wheel which surrounds the aperture.

18. A method of fabricating a composite vehicle wheel in accordance with claim 17 wherein step d) includes:
i) providing the cylindrical body with a mounting collar,
ii) providing a bore through the mounting post,
iii) inserting a screw having an enlarged head into the bore, and
iv) tightening the screw until the enlarged head engages the mounting collar.

19. A method of fabricating a composite vehicle wheel in accordance with claim 17, further including the step of:
positioning closed cell foam between the inner face of the cladding and the outer face of the wheel prior to performing step f).

* * * * *